United States Patent [19]
Alt et al.

[11] Patent Number: 4,612,126
[45] Date of Patent: Sep. 16, 1986

[54] CLARIFYING FILTERING CENTRIFUGE AND METHOD OF USE

[75] Inventors: Christian Alt, Munich; Arthur Köber, Lochham; Willi Kiesewetter, Esslingen, all of Fed. Rep. of Germany

[73] Assignee: Dr. M, Dr. Müller AG, Männedorf, Switzerland

[21] Appl. No.: 432,394

[22] Filed: Sep. 30, 1982

[30] Foreign Application Priority Data

Oct. 19, 1981 [CH] Switzerland .................... 6660/81

[51] Int. Cl.⁴ .................... B01D 29/04; B01D 29/42
[52] U.S. Cl. .................... 210/787; 210/405; 210/456; 494/36
[58] Field of Search .................... 210/369, 378, 360.1, 210/377, 379, 512.3, 781, 787, 405, 456; 494/36, 40, 41

[56] References Cited

U.S. PATENT DOCUMENTS

| | | | |
|---|---|---|---|
| 3,389,855 | 6/1968 | Müller | 494/38 |
| 3,396,103 | 8/1968 | Huntington | 210/342 |
| 3,437,209 | 4/1969 | Evans | 210/377 |
| 3,797,662 | 3/1974 | Titus | 210/360.1 |
| 4,401,429 | 8/1983 | Koslowski | 494/40 |

FOREIGN PATENT DOCUMENTS

2656271 7/1977 Fed. Rep. of Germany ........ 494/36
406076 7/1966 Switzerland .

Primary Examiner—David L. Lacey
Attorney, Agent, or Firm—Michael J. Striker

[57] ABSTRACT

Separation of solid matter in a clarifying filtering centrifuge is performed by axially supplying a suspension, accelerating the axially supplied suspension by deflecting the latter via a distributing cone, radially deflecting the accelerated suspension over a rear wall of a separating chamber to a closed peripheral wall of the same, and thereafter axially deflecting the suspension in direction toward filter elements arranged normal to an axis of rotation of the centrifuge.

10 Claims, 1 Drawing Figure

U.S. Patent Sep. 16, 1986 4,612,126
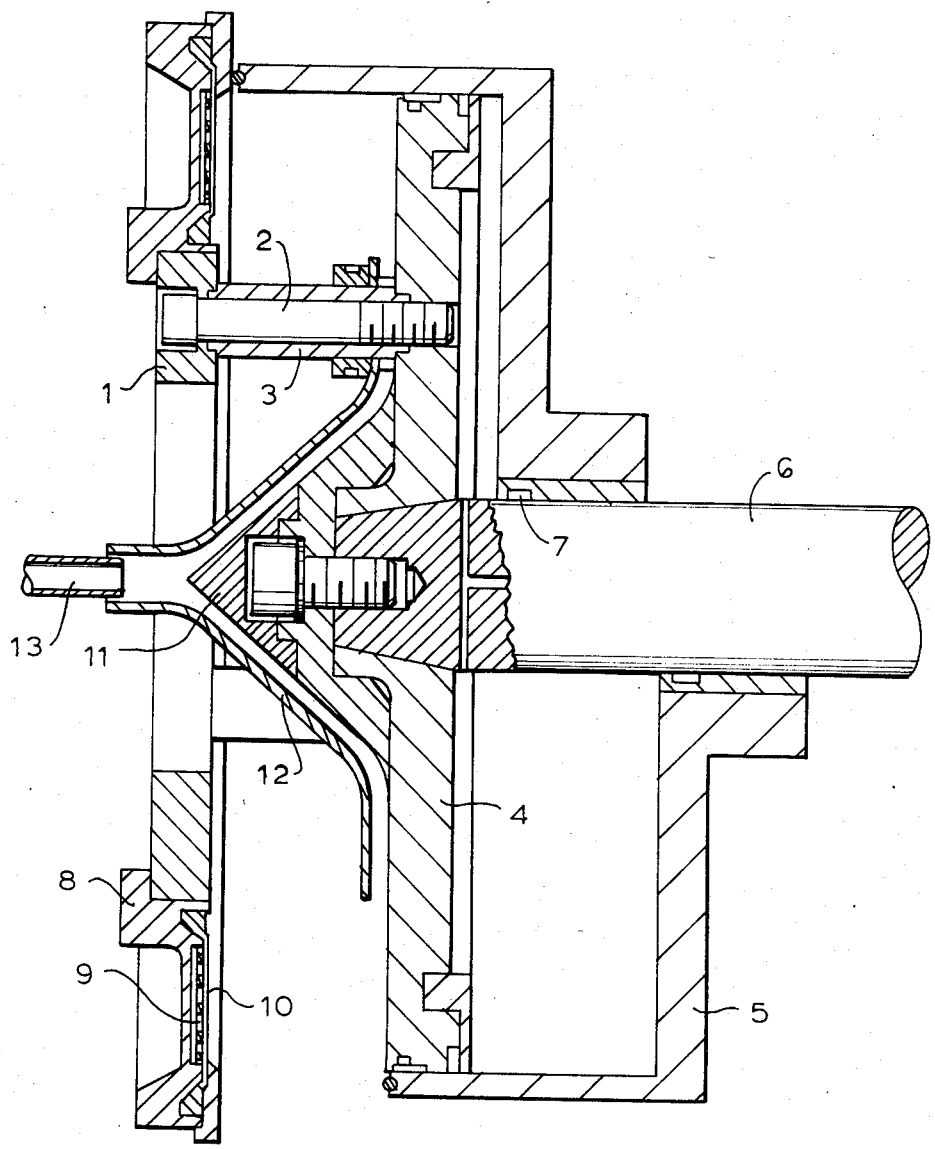

CLARIFYING FILTERING CENTRIFUGE AND METHOD OF USE

BACKGROUND OF THE INVENTION

The present invention relates to a method of separating solid particles from suspensions in a centrifuge, as well as to a centrifuge for such a separation. More particularly, it relates to a method and a centrifuge in which a solid-liquid mixture is separated by a combination of sedimentation and filtration with the aid of a centrifugal force.

There are basically two different groups of centrifuges namely solid-jacket centrifuges and filter centrifuges. In the solid-jacket centrifuges, the heavy phase sediments on a drum wall, whereas the lighter phase flows out via a weir. These centrifuges are used for example for clarifying liquids. In the filter centrifuges, the liquid flows through a filter cake and a filter means and subsequently into the separating chamber. These centrifuges are used mainly for dewatering of mud. The special feature of the inventive centrifuge is that both a filtration and a sedimentation take place in the same. Such a clarifying filtering centrifuge cannot be associated with the known centrifugal action.

U.S. Pat. No. 3,389,855 discloses a centrifuge for materials difficult to filter. The separation which is performed here by superposing of two different separation processes. The separation of a suspension into a liquid and a solid phase is carried out by sedimentation and filtration. This centrifuge substantially includes two advantageously parallel plate-shaped bodies which are fixedly connected with a rotatable shaft and extend normal to the latter and which form a hollow space for receiving the liquid. This hollow space is closed at its periphery by a tubular body displaceable in direction of the rotatable shaft and can be opened for discharge of the solid material. A separating insert composed of a fabric is mounted normal to the rotatable shaft in a recess of one of the plates and serves as a filtering means. The rear wall of the chamber is provided for mounting with the front wall with several braces. The suspension flows axially through a hollow shaft directly into the hollow space and exits partially through the filtering means and partially via a deflecting disk directly through the axis-close opening. Because of the feeding of the suspension via the hollow shaft directly into the filtering chamber of the centrifuge indefinite flow conditions and a non-uniform cake formation take place.

Because of a relatively great opening of the filter means, a penetration of the filtrate is provided, i.e. the filtrate is united with the solid material. An excessively great number of pins on the rear wall of the chamber has the great disadvantage that during the rotation the pins act as a mill and because of this the solid particles in the suspension are further comminuted. The separation of small particles of emulsions is difficult. The great number of pins also causes disturbances in the flow discharge. A further disadvantage is the mounting of the filtering fabric on the flat faces of the filter plates, whereby the filtrate discharge is difficult. A predetermined residual moisture of the filter cake cannot be attained.

SUMMARY OF THE INVENTION

Accordingly, it is an object of the present invention to provide a method of separating solid particles which are difficult to filter from a suspension with a clarifying filtering centrifuge, which provides for complete separation of the solid matter from the suspension so that an optically clear liquid is produced.

A further object of the present invention is to provide a clarifying filtering centrifuge which makes possible to implementation of the inventive method.

In keeping with these objects, and with others which will become apparent hereinafter, one feature of the present invention resides, briefly stated, in a method of separating solid particles from suspensions in accordance with which an axially supplied suspension is accelerated by deflecting via a distributing cone, then deflected radially on a rear wall of a chamber toward a peripheral wall, and is again axially deflected in direction toward filter elements arranged normal to an axis of rotation.

Another feature of the present invention is a clarifying filtering centrifuge which is provided with a distributing cone arranged so that an axially supplied suspension is accelerated by deflecting with this distributing cone, and then the suspension is deflected radially by the rear wall to the peripheral wall and again deflected axially toward the filter elements.

When the method is performed and the centrifuge is designed in accordance with the present invention, during deflection of the suspension in the distributing cone the suspension accelerates and the axial stream is superposed on a rotary stream. The suspension flows then radially on the rear wall of the chamber outwardly toward the peripheral or drum wall. Then the suspension is deflected axially in direction toward the filter elements or plates. Because of the centrifugal forces and mass moment of inertia forces, the solid particles settle on the peripheral wall and form a cake. The liquid in contrast flows over the particles through the filtering means axially outwardly of the separating chamber.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a view showing a separation chamber of a clarifying filtering centrifuge in accordance with the present invention, wherein an upper part of the drawing shows the centrifuge in closed condition, and the lower part of the drawing shows the centrifuge in open condition.

DESCRIPTION OF A PREFERRED EMBODIMENT

A clarifying and filtering centrifuge in accordance with the present invention has walls forming a closed separation space and including a front chamber wall which is identified by reference numeral 1 and a rear chamber wall which is identified by reference numeral 4. The front chamber wall is connected with the rear chamber wall by three pins 2 which are inserted in protective sleeves 3. Only one of the pins with the protective sleeve is shown in the drawing.

The above mentioned walls, which form the separating space, further include a solid peripheral wall or jacket which is identified by reference numeral 5 and mounted on a shaft 6. The jacket 5 which can be composed of a rustproff steel is slidably arranged on the shaft 6 via an O-ring 7. A filter plate 8 is mounted at the periphery of the front chamber wall 1. A filtering means 10 is mounted by two clamping rings via a supporting sheet 9. The free filtering surface of the filter plate 8 is limited inwardly by one clamping ring and outwardly by an attached stop ring. The jacket or drum 5 presses against the stop ring in closed condition of the separating chamber.

Liquid-permeable membranes having a thickness of 0.1–0.5 mm, preferably 0.3 mm, and composed of a thin synthetic plastic layer are used as the filtering means. The surface of such membranes shows under the electron microscope a porous structure. The size of the pores is for example 0.2–10 micrometers, advantageously 0.45–5 micrometers.

A distributing cone 11 is arranged on the shaft 6. An inlet funnel 12 is mounted associated with the distributing cone 11. A stationary supply pipe 13 extends into the rotatable inlet funnel 12.

During the operation, the suspension flows via the centrally arranged supply pipe 13 into the rotatable distributing cone 11, is accelerated and distributed in a radial direction. The inlet funnel 12 prevents spraying off of the suspension. The suspension is accelerated on the distributing cone 11, and the incoming axial flow is superimposed over a rotary flow. The suspension further flows along the rear chamber wall 4 and meets then the peripheral wall or jacket 5. Then the flow of the suspension is again axially deflected in direction toward the filter plate 8.

Because of the centrifugal forces and mass moment of inertia forces, the solid particles during deflection of the radial stream in an axial stream are transported outwardly and deposited on the periphery of the drum or jacket. The density of the solid particles is greater than the liquid, so that the liquid flows over the solid particles and leaves the separating chamber through the filtering means 10. The coarse solid particles deposit preferentially in the lower part of the drum wall. The very fine particles are entrained in the stream and retained by the filtering means 10 mounted on the filter plate 8.

The suspension is supplied for so long until the liquid reaches the height of the pin sleeve 3. Then the suspension supply is interrupted, and it is dried by centrifuging. This means that the liquid which up to this time point is located in the separating chamber can discharge through the filter. A solid particle cake with a relatively low residual moisture remains.

For discharging the solid matter, the jacket 5 is displaced, with the running centrifuge, axially rearwardly and thereby opens the separating chamber. Thereby the solid matter is centrifuged outwardly. After this, the jacket is brought back with the aid of a pneumatic circuit to its working position, the separating chamber is closed, and the suspension supply can again be turned on.

The experiments showed that fine solid particles retained by the filtering means do not clog the latter. The reason for this is that the short dwell time of the liquid in the drum is not sufficient to accelerate the liquid to the rpm of the drum. A slippage is produced which results in a shearing stream so that the continuously flowing liquid prevents deposition of the particles on the surface of the filters.

The clarifying filtering centrifuge in accordance with the present invention is highly recommended for separation of mud difficult to filter, such as suspensions containing aluminum hydroxide. It is also suitable for separation, for example, of alumina hydrates, stearates, Fuller's earths, starch, herbicides, polyamyl alcohol, kaolin, organic materials, pharmaceutic materials, titanium dioxide, gels and waste mud. The field of application is, however, not limited to the above given examples.

It will be understood that each of the elements described above, or two or more together, may also find a useful application in other types of constructions differing from the types described above.

While the invention has been illustrated and described as embodied in a method and a centrifuge for separating solid particles from suspensions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of separating solid particles from suspension having coarse and fine solid particles in a clarifying filtering centrifuge formed as a single rotor with an inner chamber limited by a rear wall extending normal to an axis of rotation, a peripheral wall extending axially and being radially spaced from the axis of rotation, and a front wall provided with a filter element with a filtering surface extending normal to the axis of rotation, the method comprising the steps of supplying the suspension into said chamber in a first axial direction; accelerating the axially supplied suspension by a distributing cone having a surface which is located at an angle relative to the axis so as to deflect the axially supplied suspension radially at said angle so as to superpose an axial stream on a rotary stream; radially deflecting the accelerated suspension normal to said axis over said rear wall toward said peripheral wall, so that the coarse solid particles of the suspension deposit on said peripheral wall; and thereafter axially deflecting a liquid of the suspension with the fine solid particles over the deposited coarse solid particles in a second axial direction which is opposite to said first axial direction toward said filter element so that the fine solid particles of the suspension deposit on said filter element, while the liquid of the suspension flows axially through said filter element outwardly of the rotor; and arranging an inlet funnel having a conical portion and a radial portion so that said conical portion extends at a distance from and parallel to said surface of said distributing cone and said radial portion extends at a distance from and parallel to said rear wall so as to prevent spraying off of the suspension, the suspension being supplied through said inlet funnel.

2. A clarifying filtering centrifuge, comprising a single rotor having an axis of rotation, a plurality of walls which together form an inner chamber and include a rear wall extending normal to an axis of rotation, a peripheral wall extending axially and being radially spaced from said axis of rotation, and a front wall provided with a filter element with a filtering surface extending normal to said axis of rotation, means for supplying a suspension of coarse and fine solid particles into said chamber in a first axial direction, and a distributing cone having a surface which is located at an angle relative to the axis so as to deflect the axially supplied suspension radially at said angle and to thereby accelerate the latter and to superpose an axial stream on a rotary stream, so that the deflected suspension then flows radially normal to said axis over said rear wall toward said peripheral wall, so that coarse solid particles of the suspension deposit on said peripheral wall, while a liquid of the suspension with fine solid particles flows over the deposited course solid particles in a second axial direction which is opposite to said first axial direction toward said filter element, the fine solid particles of the suspension deposit on said filter element, while the liquid of the suspension flows axially through said filter element outwardly of said rotor, and said means for supplying the suspension comprises an inlet funnel having a conical portion and a radial portion and arranged so that said conical portion extends at a distance from and parallel to said surface of said distributing cone, and said radial portion extends at a distance from and parallel to said rear wall so as to prevent spraying off of the suspension.

3. A clarifying filtering centrifuge as defined in claim 2 and further comprising at least three pins surrounded by sleeves and connecting said rear wall with said front wall.

4. A clarifying filtering centrifuge as defined in claim 2, wherein said filter element is a filter membrane with a thickness of 0.1–0.5 mm.

5. A clarifying filtering centrifuge as defined in claim 4, wherein said membrane is composed of a synthetic plastic material.

6. A clarifying filtering centrifuge as defined in claim 4, wherein said membrane has pores of 0.2–0.45 micrometer.

7. A clarifying filtering centrifuge as defined in claim 2, wherein said peripheral wall is formed as a part of a solid jacket comprised of a rustproof steel.

8. A clarifying filtering centrifuge as defined in claim 2; and further comprising a rotatable shaft supporting said distributing cone.

9. A clarifying filtering centrifuge as defined in claim 2, wherein said filter element includes a filter plate which has a filtrate collecting space formed as a chamber, and filtering material mounted on said filter plate.

10. A clarifying filtering centrifge as defined in claim 2, wherein said filter element includes a filter plate and filtering membrane of a synthetic plastic material mounted thereon.

* * * * *